(12) United States Patent
Jeon et al.

(10) Patent No.: US 8,905,555 B2
(45) Date of Patent: Dec. 9, 2014

(54) IMAGE PROJECTION APPARATUS PROVIDED WITH NO RELAY LENS

(75) Inventors: Wook-jae Jeon, Hwaseong-si (KR); Jong-hoi Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 56 days.

(21) Appl. No.: 13/477,677

(22) Filed: May 22, 2012

(65) Prior Publication Data

US 2012/0300180 A1 Nov. 29, 2012

(30) Foreign Application Priority Data

May 25, 2011 (KR) .............................. 2011-0049463

(51) Int. Cl.
| | | |
|---|---|---|
| G03B 21/28 | (2006.01) | |
| G03B 21/20 | (2006.01) | |
| G02B 27/14 | (2006.01) | |
| G03B 33/12 | (2006.01) | |
| G02B 27/10 | (2006.01) | |

(52) U.S. Cl.
CPC ........ G02B 27/1033 (2013.01); G03B 21/2066 (2013.01); G02B 27/149 (2013.01); G03B 33/12 (2013.01); G03B 21/2033 (2013.01)
USPC ................... 353/98; 353/30; 353/33; 353/37; 353/94; 353/99; 359/530; 359/649

(58) Field of Classification Search
USPC ............ 353/30, 31, 33, 34, 37, 38, 94, 98.99; 359/630, 649, 728, 754, 531, 530, 532, 359/535, 536, 558; 348/743–747; 349/5, 349/7–9
See application file for complete search history.

(56) References Cited

U.S. PATENT DOCUMENTS

| | | | | |
|---|---|---|---|---|
| 5,159,172 A * | 10/1992 | Goodman et al. | ....... | 219/121.68 |
| 7,237,902 B2 * | 7/2007 | Koo | ............... | 353/22 |
| 7,959,305 B2 * | 6/2011 | Destain | ............... | 353/99 |
| 8,210,689 B2 * | 7/2012 | Magarill | ............... | 353/81 |
| 8,259,382 B2 * | 9/2012 | Mehrl | ............... | 359/291 |
| 8,523,362 B2 * | 9/2013 | Huang et al. | ............... | 353/31 |
| 2003/0030913 A1 | 2/2003 | Park et al. | | |
| 2004/0189952 A1 * | 9/2004 | Kuratomi | ............... | 353/31 |
| 2005/0259229 A1 | 11/2005 | Lee et al. | | |
| 2006/0164600 A1 * | 7/2006 | Morejon et al. | ............... | 353/31 |
| 2006/0221258 A1 * | 10/2006 | Lee et al. | ............... | 348/744 |
| 2009/0135315 A1 | 5/2009 | Endo et al. | | |
| 2009/0190101 A1 * | 7/2009 | Alasaarela et al. | ............... | 353/81 |
| 2010/0007852 A1 * | 1/2010 | Bietry et al. | ............... | 353/8 |
| 2010/0045938 A1 | 2/2010 | Lin et al. | | |
| 2011/0176120 A1 * | 7/2011 | Geissler et al. | ............... | 353/97 |

OTHER PUBLICATIONS

Communication dated Jul. 15, 2013 issued by the European Patent Office in counterpart European Patent Application No. 12160873.1.

* cited by examiner

Primary Examiner — Sultan Chowdhury
(74) Attorney, Agent, or Firm — Sughrue Mion, PLLC

(57) ABSTRACT

An image projection apparatus is provided, which includes an illumination unit which generates illumination light, a first prism which receives the illumination light from the illumination unit and performs total reflection of the illumination light, a reflection mirror which receives the illumination light from the first prism and reflects the illumination light, an image forming unit which forms an image from the illumination light that is reflected from the reflection mirror, and a second prism which performs total reflection of the image that is formed by the image forming unit toward a screen.

19 Claims, 3 Drawing Sheets

IMAGE PROJECTION APPARATUS PROVIDED WITH NO RELAY LENS

PRIORITY

This application claims priority from Korean Patent Application No. 10-2011-0049463, filed on May 25, 2011, in the Korean Intellectual Property Office, the disclosure of which is incorporated herein by reference.

BACKGROUND

1. Field

Apparatuses consistent with embodiments relate to an image projection apparatus, and more particularly to an image projection apparatus provided with a pair of prisms for guiding illumination light to an image forming unit (for example, a digital micromirror device (DMD) panel).

2. Description of the Related Art

An image projection apparatus is an apparatus that converts illumination light generated in an illumination unit into an image having image information and performs extended projection of the image onto a screen.

One type of image projection apparatus includes an illumination unit generating illumination light, a light uniformity unit (for example, a light tunnel or a fly eye lens) making the illumination light uniform, relay lenses adjusting an illumination area of the uniform illumination light with an appropriate size, a pair of prisms changing a path of the illumination light having passed through the relay lenses, an image forming unit (for example, a DMD panel) converting the illumination light that is guided by the prisms into an image, and a projection lens unit performing extended projection of the image onto a screen.

The pair of prisms include a first prism performing total reflection of the illumination light to the image forming unit, and a second prism guiding the image that is formed by the image forming unit to the projection lens unit. Here, the first prism has a total reflection surface, but the second prism does not have the total reflection surface. This feature is in distinction to the features of the embodiments to be described later.

In the above-described type of image projection apparatus, the illumination unit, the light uniformity unit, and the relay lenses are substantially arranged in a line along the length direction of the image projection apparatus. In the case of such an image projection apparatus, the number of components arranged along the length direction is relatively large, and thus it is not easy to design the image projection apparatus having a reduced length direction. Accordingly, such a type of image projection apparatus is unfit for being applied to a mobile phone or a pico projector that requires miniaturization design.

SUMMARY

According to an aspect of an embodiment, there is provided an image projection apparatus that can satisfy miniaturization design requirements by reducing the number of components arranged in the length direction.

According to another aspect of an exemplary embodiment, an image projection apparatus includes a reflection mirror receiving illumination light from a first prism and reflecting the illumination light; an image forming unit forming an image from the illumination light that is reflected from the reflection mirror; and a second prism performing total reflection of the image that is formed by the image forming unit toward a screen.

The reflection surface of the reflection mirror may have a curvature so that the illumination light that is reflected from the reflection mirror is extended or reduced to correspond to an effective area of the image forming unit.

The reflection surface of the reflection mirror may be a concave surface.

The first prism may have a first total reflection surface that performs total reflection of the illumination light, and the second prism may have a second total reflection surface that performs total reflection of the image.

The first total reflection surface and the second total reflection surface may be arranged to be opposite to each other through an air gap.

The second total reflection surface may perform total reflection of on-beams that constitute the image, and may refract off-beams that do not constitute the image.

The reflection mirror and the image forming apparatus may be arranged to be opposite to each other through the first prism and the second prism.

The image projection apparatus according to an embodiment may further include a light uniformity unit arranged between the illumination unit and the first prism to make the intensity of the illumination light that is irradiated from the illumination unit uniform.

The image projection apparatus according to an embodiment may further include a projection lens unit performing extended projection of the image that is totally reflected from the second prism toward the screen.

The light uniformity unit and the projection lens unit may be arranged to be opposite to each other through the first prism and the second prism.

The image forming unit may be a DMD panel.

BRIEF DESCRIPTION OF THE DRAWINGS

The above and/or other aspects, features and advantages of the embodiments will be more apparent from the following detailed description when taken in conjunction with the accompanying drawings, in which.

DETAILED DESCRIPTION

Hereinafter, an image projection apparatus according to an embodiment will be described in detail with reference to the accompanying drawings.

Figure 1:
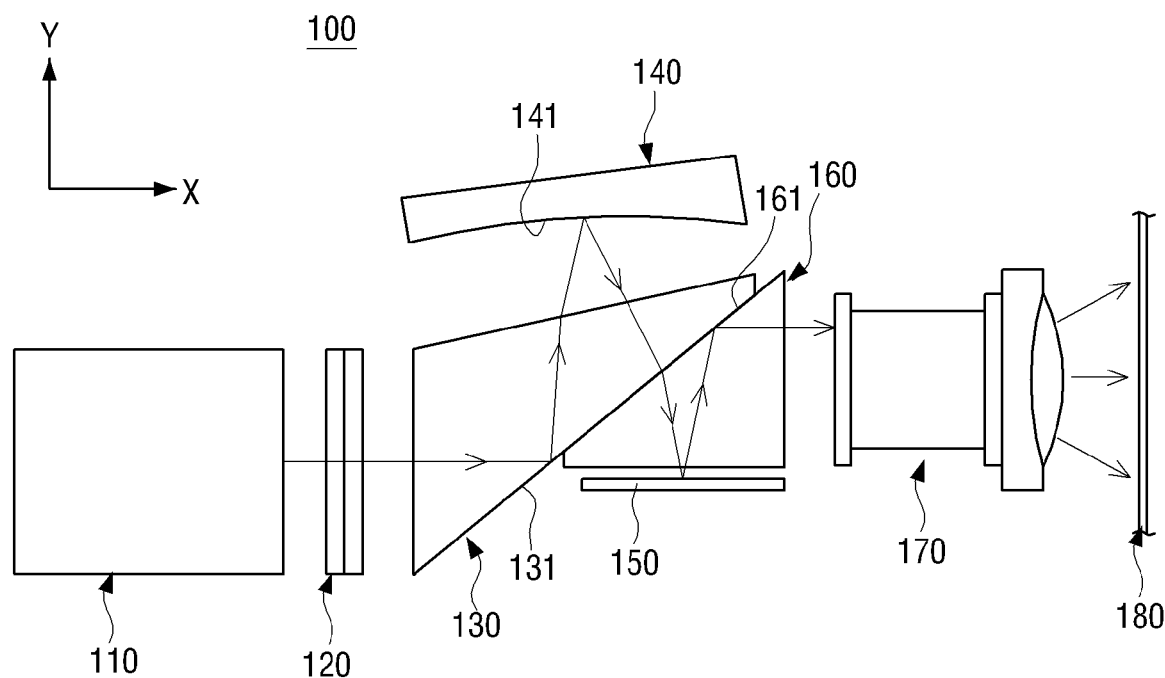
FIG. 1 is a schematic view of an image projection apparatus according to an embodiment.
Figure 2:
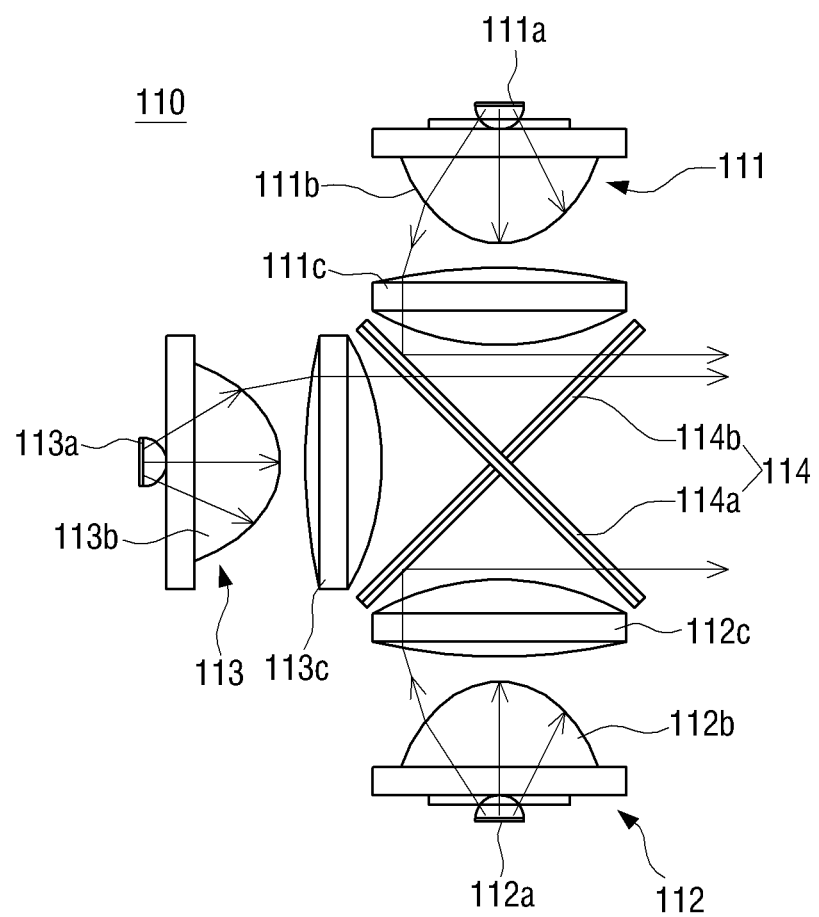
FIG. 2 is a plan view of an illumination unit provided in the image projection apparatus of FIGS. 1.
Figure 3:
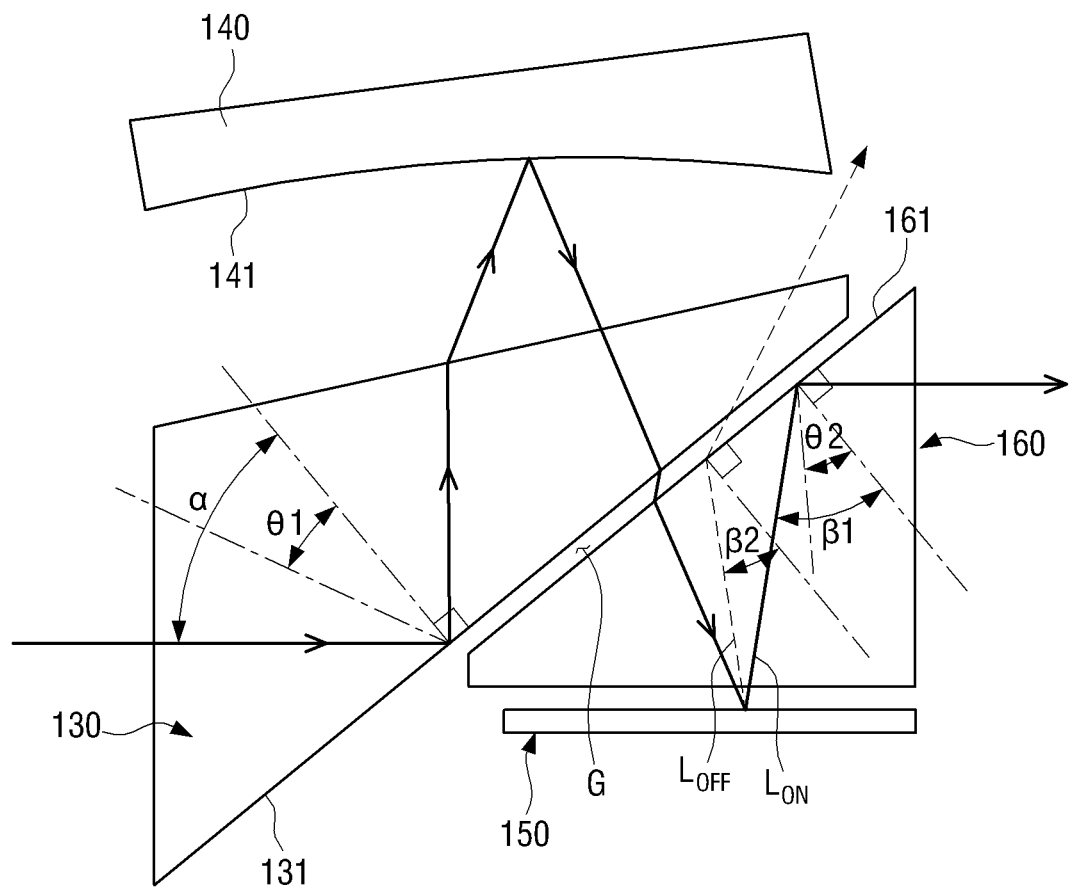
FIG. 3 is an enlarged view of a pair of prisms, an image forming unit, and a reflection mirror provided in the image projection apparatus of FIG. 1.

FIG. 1 is a schematic view of an image projection apparatus according to an embodiment, FIG. 2 is a plan view of an illumination unit provided in the image projection apparatus of FIG. 1, and FIG. 3 is an enlarged view of a pair of prisms, an image forming unit, and a reflection mirror provided in the image projection apparatus of FIG. 1.

Referring to FIGS. 1 to 3, the image projection apparatus 100 includes an illumination unit 110, a light uniformity unit 120, a first prism 130, a reflection mirror 140, an image forming unit 150, a second prism 160, a projection lens unit 170, and a screen 180.

The illumination unit 110 provides illumination light to be used in forming an image. As illustrated in FIG. 2, the illumination unit 110 includes a first illumination unit 111, a second illumination unit 112, a third illumination unit 113, and a dichroic filter unit 114.

The first illumination unit 111 includes a first LED light source 111a generating red light, and a pair of light collectors 111b and 111c. The red LED light generated by the first LED light source 111a is collected by the pair of light collectors 111b and 111c, and is irradiated toward the dichroic filter unit 114. Thereafter, the red LED light is reflected toward the light uniformity unit 120 (see FIG. 1) by a first dichroic filter 114a of the dichroic filter unit 114. Here, the first dichroic filter 114a is a filter having the characteristics that it reflects only the red light, and transmits other lights.

The second illumination unit 112 includes a second LED light source 112a generating blue light, and a pair of light collectors 112b and 112c. The blue LED light generated by the second LED light source 112a is collected by the pair of light collectors 112b and 112c, and is irradiated toward the dichroic filter 114. Thereafter, the blue LED light is reflected toward the light uniformity unit 120 by a second dichroic filter 114b of the dichroic filter unit 114. Here, the second dichroic filter 114b is a filter having the characteristics that it reflects only the blue light, and transmits other lights.

The third illumination unit 113 includes a third LED light source 113a generating green light, and a pair of light collectors 113b and 113c. The green LED light generated by the third LED light source 113a is collected by the pair of light collectors 113b and 113c, and is irradiated toward the dichroic filter unit 114. Since the first and second dichroic filters 114a and 114b of the dichroic filter unit 114 commonly transmit the green light, the green LED light that is generated by the third LED light source 113a can be irradiated toward the light uniformity unit 120 without being reflected by the dichroic filter unit 114.

As described above, since all the red, blue, and green LED lights which are generated by the first to third illumination units 111, 112, and 113 are irradiated toward the light uniformity unit 120 (see FIG. 1), the illumination light that is incident to the light uniformity unit 120 is in a state where the red, blue, and green LED lights are mixed.

In this embodiment, it is exemplified that the illumination unit 110 includes LED lights 111a, 112a, and 113a. However, in other alternative embodiments, the illumination unit 110 may be provided with a lamp that generates white light (for example, an arc lamp, a halogen lamp, and the like).

The light uniformity unit 120 includes a fly eye lens that makes the light intensity of the illumination light generated by the illumination unit 110 uniform. Accordingly, the illumination light becomes a surface light having uniform light intensity through the light uniformity unit 120. In other alternative embodiments, as the light uniformity unit 120, a light tunnel may be provided instead of the fly eye lens.

The first prism 130 performs total reflection of the illumination light having passed through the light uniformity unit 120 toward the reflection mirror 140. Accordingly, the first prism 130 has a first total reflection surface 131 that performs total reflection of the illumination light.

As illustrated in FIG. 3, an air gap G is formed between the first prism 130 and the second prism 160. According to Snell's law, the first total reflection surface 131 has a threshold angle θ1 that is determined by the refraction index of the first prism 130 and the refraction index of air. Further, the illumination light is incident to the first total reflection surface 131 at an incident angle α that is larger than the threshold angle θ1. Accordingly, the illumination light that is incident to the first total reflection surface 131 is totally reflected toward the reflection mirror 140.

The reflection mirror 140 is arranged to be opposite to the image forming unit 150 through the first prism 130 and the second prism 160, and reflects the illumination light that is totally reflected by the first prism 130 toward the image forming unit 150.

The reflection mirror 140 has a reflection surface 141 with a predetermined curvature. That is, the reflection surface 141 of the reflection mirror 140 is in the form of a curved surface. In this embodiment, the reflection mirror 140 is a kind of concave mirror, and thus the reflection surface 141 is a concave surface. However, in other alternative embodiments, the reflection surface 141 of the reflection mirror 140 may be a convex surface.

The reflection mirror 140 is provided with the curved reflection surface 141, and the illumination light may be extended or reduced through the reflection mirror 140. Accordingly, by appropriately setting the relative position of the reflection mirror 140 to the image forming unit 150, the illumination light can be extended or reduced with a size that is appropriate to the effective area of the image forming unit 150 through the reflection mirror 140.

In the case of the image projection apparatus in the related art, a plurality of relay lenses are arranged between the light uniformity unit and the first prism to adjust the illumination area of the illumination light. However, in the case of the image projection apparatus 100 according to this embodiment, the reflection mirror 140 serves as the relay lenses, and thus the relay lenses can be omitted.

As illustrated in FIG. 1, most components of the image projection apparatus 100 are arranged in the length direction (X direction) of the image projection apparatus 100. Accordingly, in order to perform miniaturization design of the image projection apparatus 100, it is required to reduce the number of components that are arranged in the length direction (X direction).

In the image projection apparatus 100 according to this embodiment, since the relay lenses are omitted, the number of components of the image projection apparatus 100, which are arranged in the length direction (X direction), is reduced, and thus the size of the image projection apparatus 100 can be reduced. Further, since the plurality of relay lenses are typically provided, the omission of the relay lenses greatly contributes to the miniaturization of the apparatus 100.

On the other hand, although the reflection mirror 140 that serves as the relay lenses is added, the reflection mirror 140 is arranged in the Y direction (thickness or width direction) of the image projection apparatus 100, and thus the size of the image projection apparatus 100 in the length direction is not increased. Accordingly, the miniaturization design of the image projection apparatus 100 is not greatly restricted by the reflection mirror 140.

The image forming unit 150 converts the illumination light that is reflected by the reflection mirror 140 into an image, and reflects the image toward the second prism 160. In this embodiment, the image forming unit 150 is provided as a DMD panel that includes a large number of micromirrors, each of which corresponds to one pixel. The micromirrors are arranged so as to be turned on or off in accordance with the movement thereof according to the image signal. Accordingly, the respective micromirrors generate on-beams in an on state, while they generate off-beam in an off state. The on-beams that are generated from the micromirrors are gathered to form one image.

The second prism 160 performs total reflection of the image that is formed in the image forming unit 150 toward the projection lens unit 170 (see FIG. 1). Accordingly, the second prism 160 has a second total reflection surface 161 for performing the total reflection of the image. The second total reflection surface 161 of the second prism 160 is arranged to be opposite to the first total reflection surface 131 of the first prism 130 through the air gap G. According to Snell's law, the second total reflection surface 161 has a threshold angle θ2 that is determined by the refraction index of the second prism 160 and the refraction index of air.

Referring to FIG. 3, the on-beams $L_{ON}$ generated by the image forming unit 150 are incident to the second total reflection surface 161 of the second prism 160 at an incident angle β1 that is larger than the threshold angle θ2 of the second prism 160. Accordingly, the on-beams $L_{ON}$ that form the image can be totally reflected toward the projection lens unit 170. By contrast, the off-beams $L_{OFF}$ generated by the image forming unit 150 are incident to the second total reflection surface 161 of the second prism 160 at an incident angle β2 that is smaller than the threshold angle θ2 of the second prism 160. Accordingly, the off-beams $L_{OFF}$ that do not form the image are refracted by the second total reflection surface 161 of the second prism 160, and do not proceed toward the projection lens unit 170.

In this embodiment, the second prism 160 is made of the same material as the first prism 130. Accordingly, the threshold angle θ2 of the second prism 160 is equal to the threshold angle θ1 of the first prism 130. In other alternative embodiments, the material of the first prism 130 may be different from the material of the second prism 160, and thus the threshold angle θ1 of the first prism 130 may be different from the threshold angle θ2 of the second prism 160.

The projection lens unit 170 is arranged to be opposite to the light uniformity unit 120 (see FIG. 1) through the first prism 130 and the second prism 160. Accordingly, the projection lens unit 170 extendedly projects the image that is reflected by the second prism 160 onto the screen 180. Although not illustrated in detail, the projection lens unit 170 includes a large number of lenses which are arranged along the light path to extend the image.

The screen 180 corresponds to a component on which the image that is extended by the projection lens unit 170 is focused.

As described above, the image projection apparatus 100 according to an embodiment has an optical structure including the first prism 130 having the first total reflection surface 131 and the second prism 160 having the second total reflection surface 161.

According to this optical structure, the reflection mirror 140, which extends or reduces the illumination area of the illumination light to match the size of the effective area of the image forming unit 150, can be applied. Since the reflection mirror 140 performs the function of the relay lenses in the related art, the relay lenses can be omitted.

As a result, the size of the image projection apparatus 100 in the length direction can be reduced relative to the image projection apparatuses in the related art, and thus the image projection apparatus 100 can satisfy the miniaturization design requirements.

While several aspects have been shown and described with reference to certain embodiments thereof, it will be understood by those skilled in the art that various changes in form and detail may be made therein without departing from the spirit and scope of the inventive concept, as defined by the appended claims.

What is claimed is:

1. An image projection apparatus comprising:
    an illumination unit which generates illumination light;
    a first prism which receives the illumination light from the illumination unit and performs total reflection of the illumination light;
    a reflection mirror which receives the illumination light from the first prism and reflects the illumination light;
    an image forming unit which forms an image from the illumination light that is reflected from the reflection mirror; and
    a second prism which performs total reflection of the image that is formed by the image forming unit toward a screen,
    wherein a reflection surface of the reflection mirror has a curvature so that the illumination light that is reflected from the reflection mirror is extended or reduced to correspond to an effective area of the image forming unit.

2. The image projection apparatus as claimed in claim 1, wherein the reflection surface of the reflection mirror is a concave surface.

3. The image projection apparatus as claimed in claim 1, wherein the first prism has a first total reflection surface that performs total reflection of the illumination light, and the second prism has a second total reflection surface that performs total reflection of the image.

4. The image projection apparatus as claimed in claim 3, wherein the first total reflection surface of the first prism and the second total reflection surface of the second prism are arranged to be opposite to each other and are separated by an air gap.

5. The image projection apparatus as claimed in claim 3, wherein the second total reflection surface of the second prism performs total reflection of on-beams that constitute the image, and refracts off-beams that do not constitute the image.

6. The image projection apparatus as claimed in claim 1, wherein the reflection mirror and the image forming apparatus are arranged to be opposite to each other and are separated by the first prism and the second prism.

7. The image projection apparatus as claimed in claim 1, further comprising a light uniformity unit arranged between the illumination unit and the first prism to make the intensity of the illumination light that is irradiated from the illumination unit uniform.

8. The image projection apparatus as claimed in claim 7, further comprising a projection lens unit which performs extended projection of the image that is totally reflected from the second prism toward the screen.

9. The image projection apparatus as claimed in claim 8, wherein the light uniformity unit and the projection lens unit are arranged to be opposite to each other and separated by the first prism and the second prism.

10. The image projection apparatus as claimed in claim 1, wherein the image forming unit is a digital micromirror device (DMD) panel.

11. The image projection apparatus as claimed in claim 1, wherein the illumination unit includes at least one light source and a dichroic filter unit.

12. The image projection apparatus as claimed in claim 1, wherein the second prism is made of a same material as the first prism.

13. The image projection apparatus as claimed in claim 1, wherein the second prism is made of a different material as the first prism.

14. An image projection apparatus comprising:
    an illumination unit, disposed on a first axis, which generates illumination light;

a first prism, disposed on the first axis, which receives the illumination light from the illumination unit and reflects the illumination light;

a reflection mirror, disposed on a second axis perpendicular to the first axis, which receives the illumination light reflected by the first prism and reflects the illumination light;

an image forming unit, disposed on the first axis, which forms an image from the illumination light reflected from the reflection mirror; and a second prism, disposed on the first axis, which receives the image from the image forming unit and reflects the image to a screen, wherein a reflection surface of the reflection mirror has a curvature so that the illumination light that is reflected from the reflection mirror is extended or reduced to correspond to an effective area of he image forming unit.

15. The image projection apparatus as claimed in claim 14, wherein the second prism is made of a same material as the first prism.

16. The image projection apparatus as claimed in claim 14, wherein the second prism is made of a different material as the first prism.

17. An image projection apparatus comprising:

an illumination unit which generates illumination light;

a first prism which receives the illumination light from the illumination unit and performs total reflection of the illumination light;

a reflection mirror which receives the illumination light from the first prism and reflects the illumination light;

an image forming unit which forms an image from the illumination light that is reflected from the reflection mirror; and a second prism, disposed opposite to the first prism and separated by the first prism by an air gap, which performs total reflection of the image that is formed by the image forming unit toward a screen, wherein the illumination unit, the first prism, the second prism, and the image forming unit are disposed on a first axis and the reflection mirror is disposed on a second axis perpendicular to the first axis, and wherein a reflection surface of the reflection mirror has a curvature so that the illumination light that is reflected from the reflection mirror is extended or reduced to correspond to an effective area of the image forming unit.

18. The image projection apparatus as claimed in claim 17, wherein the first prism has a first total reflection surface that performs total reflection of the illumination light, and the second prism has a second total reflection surface that performs total reflection of the image, and the first prism is made of a same material as the second prism.

19. The image projection apparatus as claimed in claim 17, wherein the first total reflection surface of the first prism and the second total reflection surface of the second prism are arranged to be opposite to each other and area separated by an air gap.

* * * * *